(12) United States Patent
Park et al.

(10) Patent No.: US 11,745,292 B1
(45) Date of Patent: Sep. 5, 2023

(54) METHOD OF PROCESSING GLASS PANEL

(71) Applicants: JOONGWOO NARA CO., LTD., Ansan-si (KR); BSP CO., LTD., Anyang-si (KR)

(72) Inventors: Sung Soo Park, Yongin-si (KR); Hong Jin Park, Anyang-si (KR)

(73) Assignees: JOONGWOO NARA CO., LTD., Ansan-si (KR); BSP CO., LTD., Anyang-si (KR)

( * ) Notice: Subject to any disclaimer, the term of this patent is extended or adjusted under 35 U.S.C. 154(b) by 0 days.

(21) Appl. No.: 17/991,773

(22) Filed: Nov. 21, 2022

(30) Foreign Application Priority Data

Oct. 11, 2022 (KR) ........................ 10-2022-0129583

(51) Int. Cl.
| | | |
|---|---|---|
| *B23K 26/384* | (2014.01) | |
| *B23K 26/38* | (2014.01) | |
| *B23K 26/362* | (2014.01) | |
| *B23K 26/402* | (2014.01) | |
| B23K 101/36 | (2006.01) | |
| B23K 103/00 | (2006.01) | |

(52) U.S. Cl.
CPC ............ *B23K 26/38* (2013.01); *B23K 26/362* (2013.01); *B23K 26/402* (2013.01); *B23K 2101/36* (2018.08); *B23K 2103/54* (2018.08)

(58) Field of Classification Search
CPC ................ C03C 23/0025; C03C 15/00; H01L 21/02422; B23K 26/38; B23K 26/362; B23K 26/402; B23K 2101/36; B23K 2103/54
USPC ........................................................ 219/121.67
See application file for complete search history.

(56) References Cited

U.S. PATENT DOCUMENTS

| | | | | |
|---|---|---|---|---|
| 5,352,325 A | * | 10/1994 | Kato | ....................... H05K 3/002 216/18 |
| 8,533,942 B2 | * | 9/2013 | Ohashi | ...................... H05K 1/02 29/846 |
| 2014/0035935 A1 | * | 2/2014 | Shenoy | ................... H01L 23/15 174/257 |
| 2014/0251947 A1 | * | 9/2014 | Hong | ...................... C03C 15/00 216/13 |

(Continued)

FOREIGN PATENT DOCUMENTS

| | | |
|---|---|---|
| JP | 2009-117771 A | 5/2009 |
| KR | 10-2009-0079342 A | 7/2009 |
| KR | 10-2017-0063933 A | 6/2017 |

*Primary Examiner* — Jimmy Chou
(74) *Attorney, Agent, or Firm* — Revolution IP, PLLC

(57) ABSTRACT

A glass panel processing method includes a first deformed portion formation step in which, in order to form a via-hole in a glass substrate, a first deformed portion is formed to a first depth from the upper surface of the glass substrate through irradiation with a laser beam along a planned via-hole line, a second deformed portion formation step in which, in order to cut the glass substrate into unit cells, a second deformed portion is formed to a second depth in the glass substrate through irradiation with a laser beam along a planned cutting line, and an etching step in which, the glass substrate with the first deformed portion and the second deformed portion formed therein is etched such that etching of the glass substrate along the planned cutting line is completed before completion of etching of the glass substrate along the planned via-hole line.

10 Claims, 5 Drawing Sheets

(56) References Cited

U.S. PATENT DOCUMENTS

| | | | |
|---|---|---|---|
| 2015/0318210 A1* | 11/2015 | Budd | B23K 26/364 |
| | | | 219/121.68 |
| 2017/0358447 A1* | 12/2017 | Tsunetomo | B23K 26/50 |
| 2018/0085857 A1* | 3/2018 | Gupta | B23K 26/0006 |
| 2018/0342450 A1* | 11/2018 | Huang | H01L 21/4864 |
| 2018/0342451 A1* | 11/2018 | Dahlberg | B23K 26/55 |
| 2019/0027513 A1* | 1/2019 | Dong | H01L 27/1296 |
| 2019/0119150 A1* | 4/2019 | Burket | C03C 23/0025 |
| 2020/0130105 A1* | 4/2020 | Isobe | B23K 26/402 |
| 2020/0335397 A1* | 10/2020 | Xiao | H01L 27/1218 |
| 2021/0114925 A1* | 4/2021 | Park | C03C 23/0025 |
| 2021/0122673 A1* | 4/2021 | Park | B23K 26/55 |
| 2021/0287576 A1* | 9/2021 | Park | B32B 17/06 |

* cited by examiner (a)

(b)

METHOD OF PROCESSING GLASS PANEL

FIELD

The present invention relates to a glass panel processing method and, more particularly, to a glass panel processing method in which a mother glass panel having a display layer is cut into unit cell glass panels while forming via-holes in the mother glass panel.

BACKGROUND

Recently, a panel for display devices such as smartphones and tablet computers is manufactured in the form of a glass panel by laminating a display layer on a base substrate formed of glass.

In order to manufacture a glass panel for display devices, first, a display layer is formed on a mother glass panel, followed by a cutting process in which the mother glass panel is cut and divided into multiple unit cell glass panels.

After the cutting process, a via-hole that will be used as a speaker hole, a camera hole, and the like is formed through each of the multiple unit cell glass panels.

Conventionally, the process of cutting the mother glass panel and the process of forming via-holes in the multiple unit cell-type glass panels are performed in a sequential manner, causing significant increase in time and cost for manufacture of a final panel product used in display devices.

In addition, since the via-hole formation process is performed for each of the multiple unit cell-type glass panels, problems such as breakage of the glass panels occur frequently in the course of handling the glass panels and handling of the glass panels becomes complicated.

RELATED LITERATURE

Patent Document (Patent Document 1) Korean Patent Laid-open Publication No. 2009-0079342 (issued on Jul. 22, 2009)

SUMMARY

Embodiments of the present invention are conceived to solve such problems in the art and it is an object of the present invention to provide a glass panel processing method that allows production of a glass panel for display devices in a cost- and time-saving manner while preventing damage to the glass panel by simultaneously performing cutting of a mother glass panel into unit cell glass panels and formation of a via-hole in the mother glass panel.

It will be understood that objects of the present invention are not limited to the above. The above and other objects of the present invention will become apparent to those skilled in the art from the detailed description of the following embodiments in conjunction with the accompanying drawings.

In accordance with one aspect of the present invention, there is provided a method of manufacturing a glass panel including a glass substrate, a display layer laminated on an upper surface of the glass substrate to display an image, and a protective layer laminated on an upper surface of the display layer to protect the display layer from an etchant, the method including: a first deformed portion formation step in which, in order to form a via-hole in the glass substrate, a first deformed portion is formed to a first depth from the upper surface of the glass substrate through irradiation with a laser beam along a planned via-hole line while allowing a first non-deformed portion not irradiated with the laser beam to be formed between the first deformed portion and a lower surface of the glass substrate; a second deformed portion formation step in which, in order to cut the glass substrate into unit cells, a second deformed portion is formed to a second depth in the glass substrate through irradiation with a laser beam along a planned cutting line; and an etching step in which the glass panel with the first deformed portion and the second deformed portion formed therein is etched such that etching of the glass substrate along the planned cutting line is completed before completion of etching of the glass substrate along the planned via-hole line.

In accordance with another aspect of the present invention, there is provided a method of manufacturing a glass panel including a glass substrate, a display layer laminated on an upper surface of the glass substrate to display an image, and a protective layer laminated on an upper surface of the display layer to protect the display layer from an etchant, the method including: a first deformed portion formation step in which, in order to form a via-hole in the glass substrate, a first deformed portion is formed to a first depth from the upper surface of the glass substrate through irradiation with a laser beam along a planned via-hole line while allowing a first non-deformed portion not irradiated with the laser beam to be formed between the first deformed portion and a lower surface of the glass substrate; a second deformed portion formation step in which, in order to cut the glass substrate into unit cells, a second deformed portion is formed to a second depth in the glass substrate through irradiation with a laser beam along a planned cutting line; an etching step in which the glass panel with the first deformed portion and the second deformed portion formed therein is etched until etching of the glass substrate along the planned cutting line is completed with a portion of the first deformed portion along the planned via-hole line remaining unetched; and a removal step in which the remaining portion of the first deformed portion along the planned via-hole line is removed to complete formation of the via-hole in the glass substrate.

In the method according to the present invention, the second depth of the second deformed portion may be greater than the first depth of the first deformed portion.

The second deformed portion may be formed over the entire thickness of the glass substrate.

The second deformed portion may be formed to the second depth from the upper surface or the lower surface of the glass substrate.

The second deformed portion may be formed to a thickness corresponding to the second depth inside the glass substrate.

The glass substrate may be reduced in thickness from an initial thickness to a final thickness during the etching step, and the first depth of the first deformed portion may be greater than the final thickness of the glass substrate.

The glass panel processing method according to the present invention allows production of a glass panel for display devices in a cost- and time-saving manner while preventing damage to the glass panel.

In addition, the glass panel processing method according to the present invention can prevent damage to a display layer around a via-hole due to an etchant, thereby improving display quality of a final product.

In addition, the glass panel processing method according to the present invention allows formation of a via-hole to be completed by the time reduction in thickness of a glass substrate is completed and thus can shorten the overall process time through elimination of the need for a separate process.

It will be understood that advantageous effects of the present invention are not limited to the above effects, and the above and other advantageous effects of the present invention will become apparent to those skilled in the art from the detailed description of the following embodiments in conjunction with the accompanying drawings.

DRAWINGS

The above and other aspects, features, and advantages of the present invention will become apparent from the detailed description of the following embodiments in conjunction with the accompanying drawings.

DETAILED DESCRIPTION

Hereinafter, exemplary embodiments of a glass panel processing method according to the present invention will be described in detail with reference to the accompanying drawings.

Figure 1:
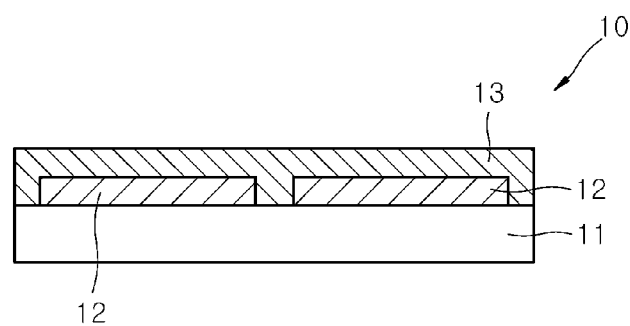
FIG. 1 is a schematic view of a glass panel processed by a glass panel processing method according to one embodiment of the present invention.
Figure 2:
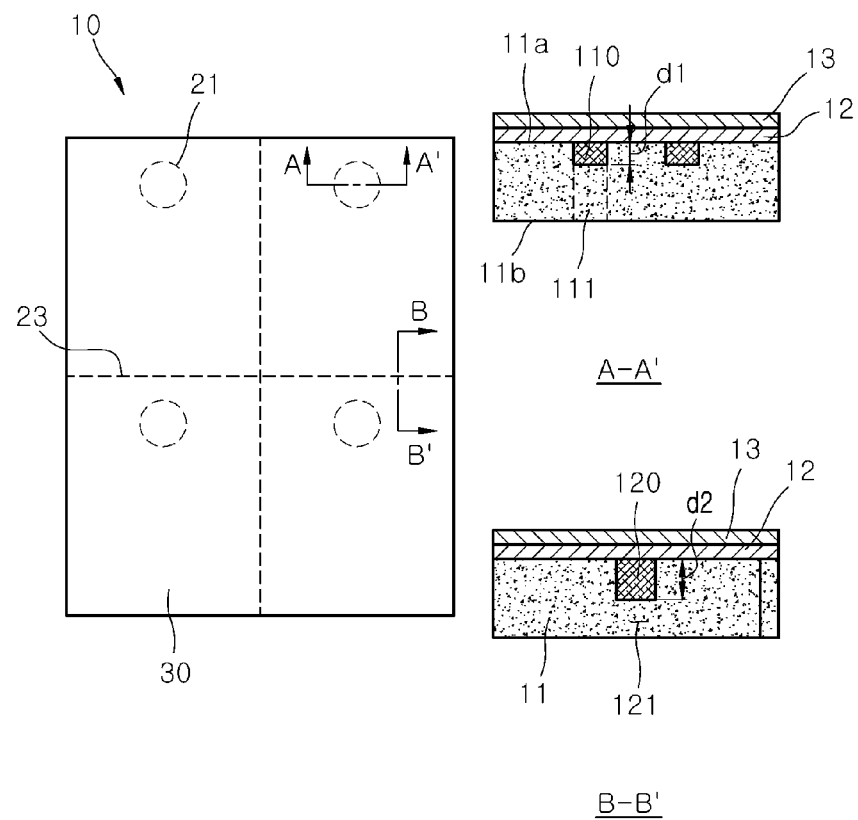
FIG. 2 is a view illustrating a first deformed portion and a second deformed portion formed by the glass panel processing method according to the embodiment.
Figure 3:
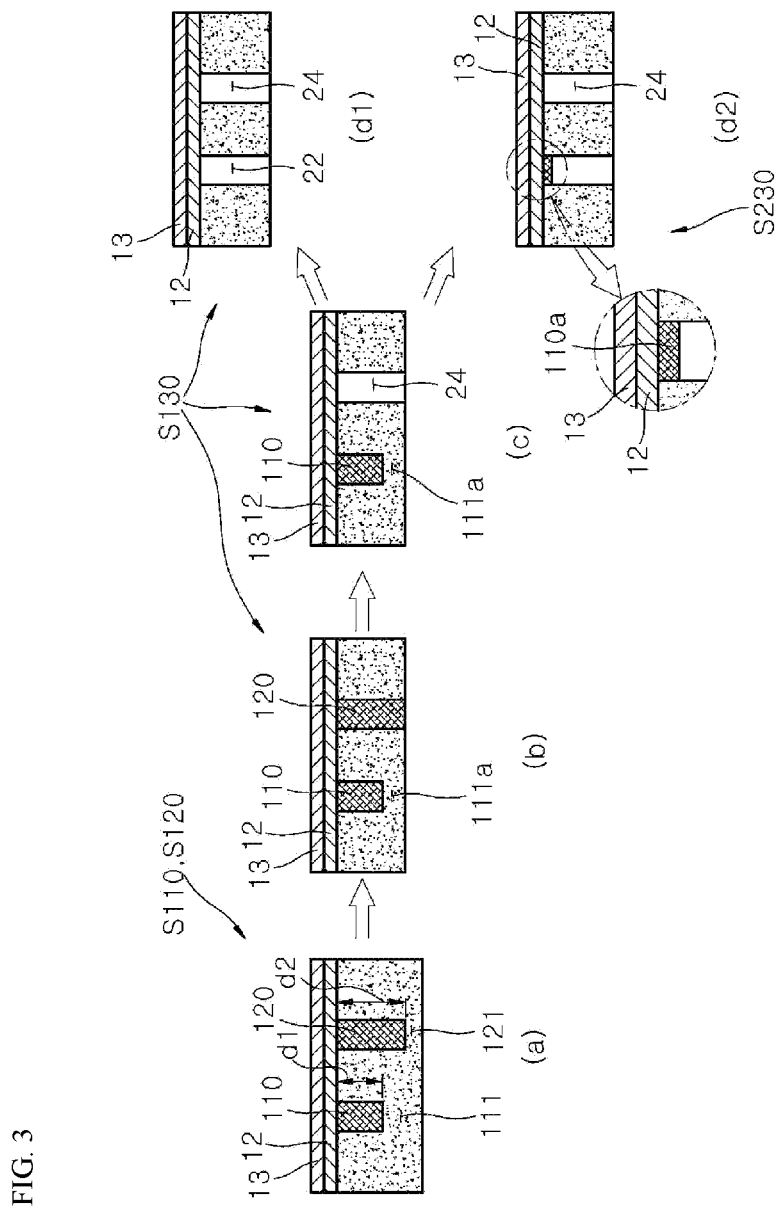
FIG. 3 is a schematic view illustrating the glass panel processing method according to the embodiment.

FIG. 1 is a schematic view of a glass panel processed by a glass panel processing method according to one embodiment of the present invention, FIG. 2 is a view of a first deformed portion and a second deformed portion formed by the glass panel processing method according to the embodiment, and FIG. 3 is a schematic view illustrating the glass panel processing method according to the embodiment.

Referring to FIG. 1 to FIG. 3, the glass panel processing method according to this embodiment is a method in which a mother glass panel having a display layer is cut into unit cell glass panels while forming via-holes in the mother glass panel, and includes a first deformed portion formation step S110, a second deformed portion formation step S120, and an etching step S130.

Referring first to FIG. 1, a glass panel 10 processed by the glass panel processing method according to this embodiment includes a glass substrate 11, a display layer 12, and a protective layer 13.

The glass substrate 11 serves as a base substrate during a series of processes in which a mother glass panel is manufactured into unit cell glass panels to produce a glass panel 10 for display devices.

The display layer 12 is laminated on an upper surface of the glass substrate 11 to display an image. For example, for an OLED glass panel, the display layer 12 may include a circuit layer, an organic light emitting layer, and an encapsulation layer. Components of the display layer 12 may be varied depending on the type of display material used (for example, OLED, LCD, and the like).

The protective layer 13 is laminated on an upper surface of the display layer 12 to protect the display layer 12 from an etchant. As will be described below, during a process in which a mother glass panel 10 is cut into unit cell glass panels 30 while forming via-holes in the mother glass panel 10, the glass panel 10 is immersed in an etchant. Here, the protective layer 13 can prevent damage to the display layer 12 due to the etchant. Preferably, the protective layer 13 is provided in the form of a film and is attached to the upper surface of the display layer 12 during the process.

In the first deformed portion formation step S110, the first deformed portion 110 is formed along a planned via-hole line 21 in the glass substrate while allowing a first non-deformed portion 111 to be formed.

Referring to FIG. 2 and FIG. 3, in the first deformed portion formation step S110, the first deformed portion 110 is formed to a first depth d1 from the upper surface 11a of the glass substrate 11 through irradiation with a laser beam along the planned via-hole line 21 in order to form a via-hole 22 in the glass substrate 11.

Here, the first deformed portion 110 is formed over a portion of an initial thickness of the glass substrate, starting from the upper surface 11a of the glass substrate 11, rather than being formed over the entire initial thickness of the glass substrate 11. In addition, the first non-deformed portion 111 is naturally formed over a region that is not irradiated with the laser beam and does not undergo deformation, that is, a region between the first deformed portion 110 and a lower surface 11b of the glass substrate.

In the second deformed portion formation step S120, the second deformed portion 120 is formed along a planned cutting line 23 in the glass substrate.

Referring to FIG. 2 and FIG. 3, in the second deformed portion formation step S120, the second deformed portion 120 is formed to a second depth d2 from the upper surface of the glass substrate 11 through irradiation with a laser beam along the planned cutting line 23 in order to cut the glass substrate 11 into unit cells 30.

In addition, a second non-deformed portion 121 is naturally formed over a region that is not irradiated with the laser beam and does not undergo deformation, that is, a region between the second deformed portion 120 and the lower surface 11b of the glass substrate.

The second deformed portion 120 may be formed over a portion of the initial thickness of the glass substrate 11, as shown in FIG. 2, or may be formed over the entire initial thickness of the glass substrate 11. Various shapes of the second deformed portion 120 will be described below with reference to FIG. 4.

The laser beam delivered to the glass substrate 11 in the first deformed portion formation step S110 and the second deformed portion formation step S120 may include an ultrashort laser beam including a picosecond-pulse laser beam and a femtosecond-pulse laser beam.

Upon irradiating the glass substrate 11 with the picosecond-pulse laser beam or the femtosecond-pulse laser beam, no melt layers are formed in regions other than an irradiated region and substrate material around the irradiated region does not undergo alteration. That is, irradiation with the picosecond-pulse laser beam or the femtosecond-pulse laser beam allows effective application of thermal energy only to the irradiated region, whereby the glass substrate 11 can be divided into the first deformed portion 110, which is formed through irradiation with the laser beam, and the first non-deformed portion 111, which is not irradiated with the laser beam, along the thickness of the glass substrate 11.

Upon irradiating the glass substrate 11 with the laser beam, the first deformed portion 110 and the second deformed portion 120, which are irradiated with the laser beam, may undergo phase transition from an α-phase to a β-phase.

In the first deformed portion 110 and the second deformed portion 120, permanent physicochemical structural deformation occurs by a nonlinear photoionization mechanism induced by the ultrashort laser beam. A region in which the laser beam is focused becomes rich in Si and dense and thus undergoes alteration in index of refraction.

The first deformed portion 110 and the second deformed portion 120, which are formed through irradiation with the ultrashort laser beam, may be etched by an alkaline or acidic chemical solution dozens to hundreds of times faster than the first non-deformed portion 111, the second non-deformed portion 121, and other non-deformed portions of the glass substrate 11. Here, an etching rate of the glass substrate may be regulated by various parameters, such as laser intensity, pulse duration, repetition rate, wavelength, focal length, scan rate, and concentration of the chemical solution.

The first deformed portion formation step S110 and the second deformed portion formation step S120 may be performed in any suitable order. That is, the first deformed portion formation step S110 and the second deformed portion formation step S120 may be performed simultaneously, the first deformed portion formation step S110 may be performed before the second deformed portion formation step S120, or the second deformed portion formation step S120 may be performed before the first deformed portion formation step S110.

In the etching step S130, the glass panel 10 with the first deformed portion 110 and the second deformed portion 120 formed therein is etched such that etching of the glass substrate 11 along the planned cutting line 23 is completed before completion of etching of the glass panel 10 along the planned via-hole line 21. Here, in the etching step S130, cutting of the glass substrate and formation of via-holes in the glass substrate are simultaneously performed.

Etching of the glass panel 10 may be performed by various methods, such as immersing the glass panel 10 in an etchant, spraying the etchant on the glass panel 10, and the like. In this embodiment, it is assumed that etching of the glass panel 10 is performed by immersing the glass panel 10 in the etchant.

Referring to FIG. 3, first, a portion of the first non-deformed portion 111 along the planned via-hole line 21 is removed by etching and the entirety of the second non-deformed portion 121 along the planned cutting line 23 is removed by etching (see FIG. 3(b)).

Then, a remaining portion 111a of the first non-deformed portion 111 along the planned via-hole line 21 and the second deformed portion 120 along the planned cutting line 23 are etched. As described above, the second deformed portion 120, which is a region having undergone deformation through irradiation with the laser beam, can be etched dozens to hundreds of times faster than non-deformed portions of the glass substrate.

Here, the second depth d2 of the second deformed portion 120 is preferably greater than the first depth d1 of the first deformed portion 110. That is, the length of the second non-deformed portion 121 in the thickness direction of the glass substrate is preferably smaller than the length of the first non-deformed portion 111 in the thickness direction of the glass substrate such that etching of the glass substrate 11 along the planned cutting line 23 is completed before completion of etching of the glass substrate 11 along the planned via-hole line 21 to allow a cutting-plane line 24 to be formed before a via-hole 22 (see FIG. 3(c)).

The via-hole 22 of the glass panel may be used as a camera hole for installation of a camera. Here, in order to improve product quality, it is desirable to secure as large an image displayable area as possible by preventing damage to the display layer 12 around the via-hole 22. If the display layer 12 is damaged by the etchant, an image displayable area around the via-hole 22 is reduced, causing deterioration in display quality of a final product.

The cutting-plane line 24 of the glass panel corresponds to an edge of the unit cell glass panel 30, and is separated to some degree from an image display area of a final product. That is, since a region corresponding to the cutting-plane line 24 of the glass panel is somewhat far from the image display area, some damage to the display layer 12 due to the etchant does not significantly affect display quality of the final product.

If the first depth d1 of the first deformed portion 110 is greater than the second depth d2 of the second deformed portion 120 and thus etching of the glass substrate 11 along the planned via-hole line 21 is completed before completion of etching of the glass substrate 11 along the planned cutting line 23, formation of the cutting-plane line 24 is not completed by the time the via-hole 22 is completely formed since a portion of the second non-deformed portion 121 remains unetched. Accordingly, the glass panel 10 needs to remain placed in the etchant until the remaining portion of the second non-deformed portion 121 and the second deformed portion 120 are completely etched and the cutting-plane line 24 is completely formed.

Then, the etchant can pass through the already-formed via-hole 22 and can permeate and damage the display layer 12 around a region where the via-hole 22 is to be formed.

Conversely, if the second depth d2 of the second deformed portion 120 is greater than the first depth d1 of the first deformed portion 110 and thus etching of the glass substrate 11 along the planned cutting line 23 is completed before completion of etching of the glass substrate 11 along the planned via-hole line 21, formation of the via-hole 22 is not completed by the time the cutting-plane line 24 is completely formed since the first deformed portion 110 and a portion 111a of the first non-deformed portion remain unetched.

Thereafter, the etching step S130 is maintained until the first deformed portion 110 and the portion 111a of the first non-deformed portion are completely etched and the via-hole 22 is completely formed, and the glass panel 10 is taken out from the etchant immediately after the via-hole 22 is formed. In this way, it is possible to minimize damage to the display layer 12 around a region where the via-hole 22 is to be formed, although the display layer 12 around a region where the cutting-plane line 24 is to be formed may be damaged to some extent by the etchant (see FIG. 3(d1)).

Accordingly, when the second depth d2 of the second deformed portion 120 is greater than the first depth d1 of the first deformed portion 110, it is possible to secure as large an image displayable area as possible and to improve display quality of a final product through prevention of damage to the display layer 12 around the region where the via-hole 22 is to be formed.

Referring to FIG. 3(d2), the etching step according to this embodiment may be modified as follows:

In an etching step S230 according to a modified example of the above embodiment, the glass panel 10 with the first deformed portion 110 and the second deformed portion 120 formed therein is immersed in the etchant until etching of the glass substrate 11 along the planned cutting line 23 is completed with a portion 110a of the first deformed portion along the planned via-hole line 21 remaining unetched.

After etching of the glass substrate 11 along the planned cutting line 23 is completed and the cutting-plane line 24 is formed, instead of maintaining the etching step S230 until the first deformed portion 110 is completely etched, the etching step S230 is terminated with the portion 110a of the first deformed portion along the planned via-hole line 21 remaining unetched and then the glass panel 10 is taken out from the etchant.

Here, although the via-hole 22 is not completely formed, the remaining portion 110a of the first deformed portion can completely prevent the etchant from permeating the display layer 12 around the region where the via-hole 22 is to be formed, thereby ensuring more reliable prevention of damage to the display layer 12 due to the etchant (see FIG. 3(d2)).

When the etching step S230 according to the modified example is employed, a separate removal step is needed to complete formation of the via-hole 22.

In the removal step, the remaining portion 110a of the first deformed portion along the planned via-hole line 21 is removed, such that formation of the via-hole 22 in the glass substrate 11 is completed.

Here, the remaining portion 110a of the first deformed portion along the planned via-hole line 21 may be removed by applying mechanical pressure to the remaining portion 110a or through a simple process such as irradiation with a laser beam. When the remaining portion 110a of the first deformed portion is removed, formation of the via-hole 22 in the glass substrate 11 is completed.

According to the present invention, all of the multiple unit cell glass panels 30 separated from the mother glass panel 10 by the cutting-plane line 24 may be present in the etchant in a state of being adhered to the protective layer 13, rather than being suspended in the etchant in a state of being separated from one another. Accordingly, glass panel processing can be completed simply by collecting the protective layer 13 with all the multiple unit cell glass panels 30 adhered thereto without needing to individually collect each of the multiple unit cell glass panels 30.

Figure 4:
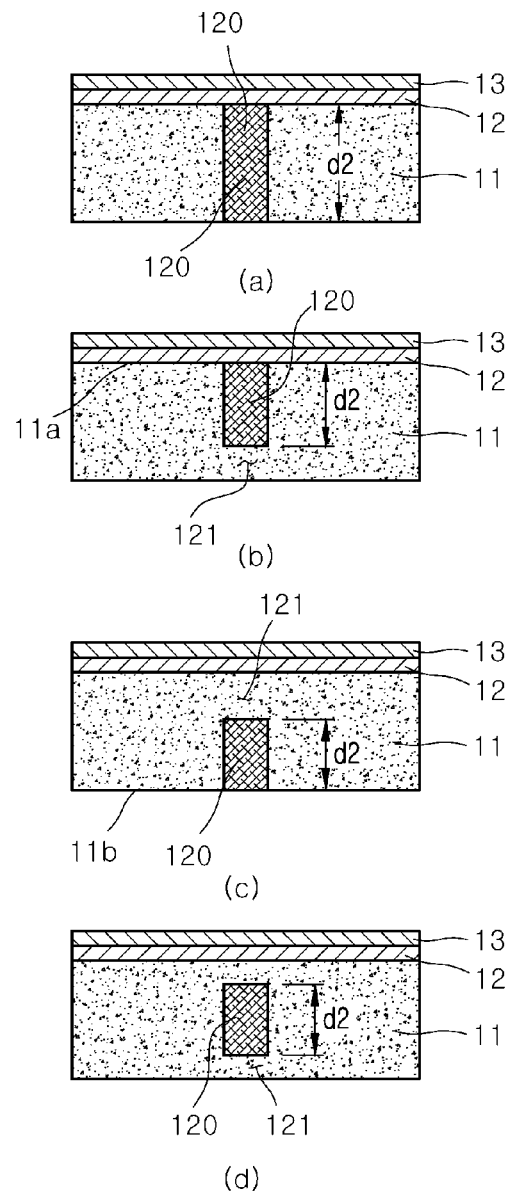
FIG. 4 illustrates various modifications of the second deformed portion in the glass panel processing method of FIG. 3.

FIG. 4 illustrates various modifications of the second deformed portion in the glass panel processing method of FIG. 3.

Referring to FIG. 4, the second deformed portion 120 may be formed over the entire initial thickness of the glass substrate 11, may be formed over a portion of the initial thickness of the glass substrate 11 to a predetermined depth d2 from the upper surface 11a of the glass substrate, may be formed over a portion of the initial thickness of the glass substrate 11 to the predetermined depth d2 from the lower surface 11b of the glass substrate, or may be formed to a thickness corresponding to the predetermined depth d2 inside the glass substrate 11.

Here, the second non-deformed portion 121 vertically aligned with the second deformed portion 120 may be naturally formed over a region not irradiated with the laser beam.

Figure 5:
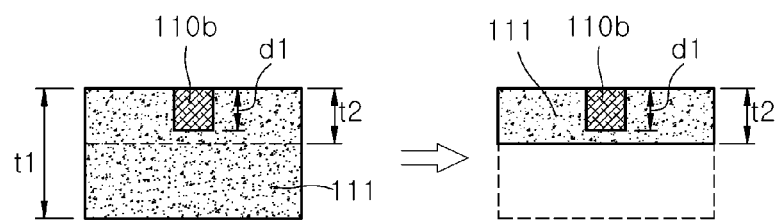
FIG. 5 is a view illustrating a case where a first depth of the first deformed portion is smaller than a final thickness of the glass substrate in the glass panel processing method of FIG. 3.
Figure 5:
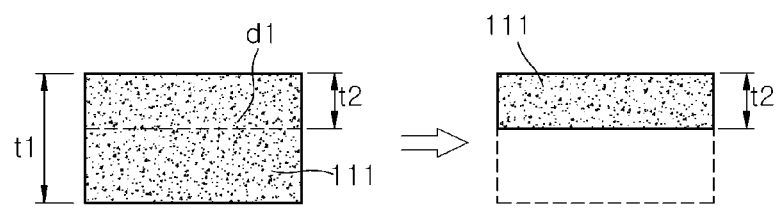
Figure 6:
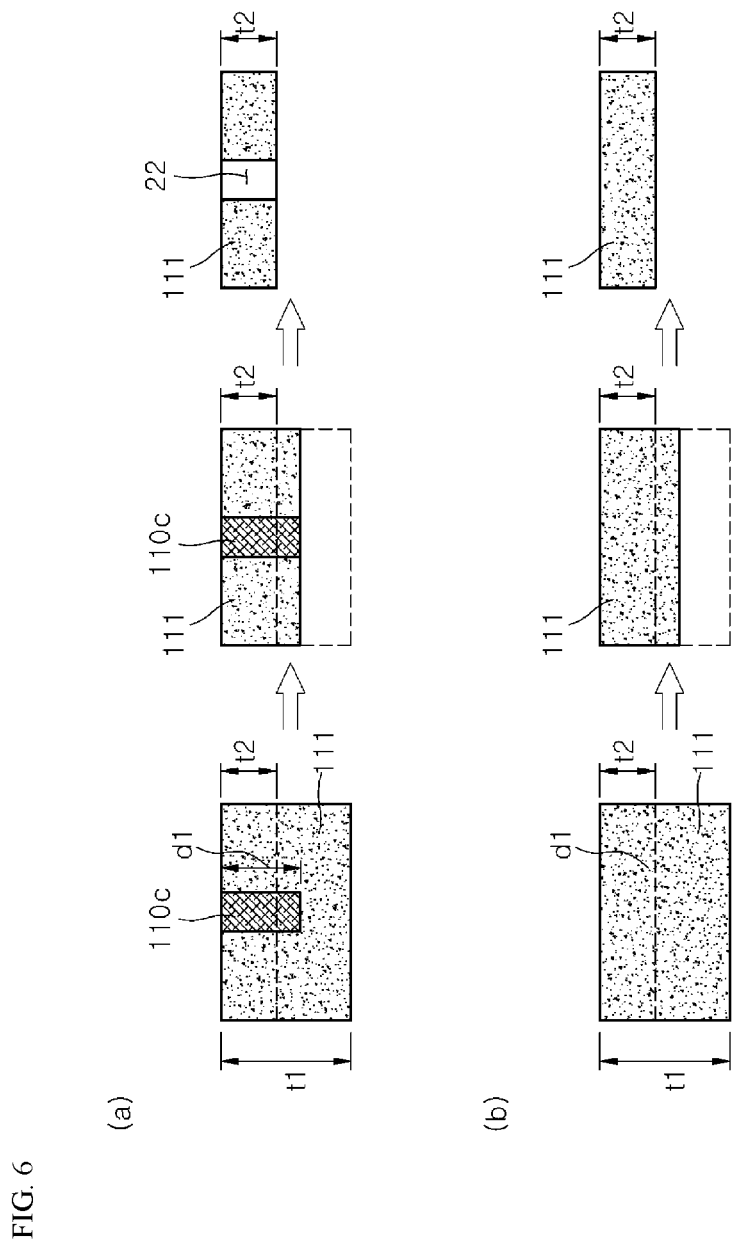
FIG. 6 is a view illustrating a case where the first depth of the first deformed portion is greater than the final thickness of the glass substrate in the glass panel processing method of FIG. 3.

FIG. 5 is a view illustrating a case where the first depth of the first deformed portion is smaller than a final thickness of the glass substrate in the glass panel processing method of FIG. 3, and FIG. 6 is a view illustrating a case where the first depth of the first deformed portion is greater than the final thickness of the glass substrate in the glass panel processing method of FIG. 3.

In the etching step S130 or S230 according to the present invention, a glass panel cutting process is performed simultaneously with a thickness reduction process in which the glass substrate 11 is reduced in thickness from an initial thickness t1 to a final thickness t2 during via-hole formation.

Since other regions of the glass substrate 11 than the first deformed portion 110 and the second deformed portion 120 are non-deformed regions not irradiated with the laser beam, reduction in thickness of the glass substrate by the etchant progresses more slowly than etching of the first deformed portion 110 and the second deformed portion 120.

Here, it is desirable that the first depth d1 of the first deformed portion 110 be greater than the final thickness t2 of the glass substrate 11.

If the first depth d1 of the first deformed portion 110b is smaller than the final thickness t2 of the glass substrate 11, as shown in FIG. 5, via-hole formation is not completed by the time reduction in thickness of the glass substrate 11 from the initial thickness t1 to the final thickness t2 is completed since a portion of the first non-deformed portion under the first deformed portion 110b remains unetched. Accordingly, a separate process is needed to remove the remaining portion of the first non-deformed portion to completely form the via-hole 22.

Nevertheless, if the glass substrate 11 is placed longer in the etchant until the remaining portion of the first non-deformed portion is etched, the thickness of the glass substrate 11 can be reduced to a degree less than the desired final thickness t2, causing problems with the quality of a final product.

Conversely, if the first depth d1 of the first deformed portion 110c is greater than the final thickness t2 of the glass substrate 11, as shown in FIG. 6, the via-hole 22 can be completely formed by the time reduction in thickness of the glass substrate 11 from the initial thickness t1 to the final thickness t2 is completed since both the first deformed portion 110c and the first non-deformed portion under the first deformed portion 110c are completely etched.

Accordingly, setting the first depth d1 of the first deformed portion 110 to be greater than the final thickness t2 of the glass substrate 11 allows formation of the via-hole 22 in the glass panel 30 to be completed by the time reduction in thickness of the glass substrate 11 from the initial thickness t1 to the final thickness t2 is completed.

The glass panel processing method according to the present invention allows production of a glass panel for display devices in a cost- and time-saving manner while preventing damage to the glass panel by simultaneously performing cutting of a mother glass panel into unit cell glass panels and formation of a via-hole in the mother glass panel.

In addition, the glass panel processing method according to the present invention can prevent damage to the display layer around the via-hole due to an etchant and thus can improve display quality of a final product by setting the second depth of the second deformed portion along the planned cutting line to be greater than the first depth of the first deformed portion along the planned via-hole line.

In addition, the glass panel processing method according to the present invention allows formation of the via-hole to be completed by the time reduction in thickness of the glass substrate is completed and thus can shorten the overall process time through elimination of the need for a separate process by setting the first depth of the first deformed portion to be greater than the final thickness of the glass substrate.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. In addition, these modifications and the like are not to be regarded as a departure from the spirit and prospect of the present invention.

LIST OF REFERENCE NUMERALS

110: First deformed portion
111: First non-deformed portion
120: Second deformed portion
121: Second non-deformed portion
S110: First deformed portion formation step
S120: Second deformed portion formation step
S130: Etching step

The invention claimed is:

1. A method of processing a glass panel comprising a glass substrate, a display layer laminated on an upper surface of the glass substrate to display an image, and a protective layer laminated on an upper surface of the display layer to protect the display layer from an etchant, the method comprising:
a first deformed portion formation step in which, in order to form a via-hole in the glass substrate, a first deformed portion is formed to a first depth from the upper surface of the glass substrate through irradiation with a laser beam along a planned via-hole line while allowing a first non-deformed portion not irradiated with the laser beam to be formed between the first deformed portion and a lower surface of the glass substrate;
a second deformed portion formation step in which, in order to cut the glass substrate into unit cells, a second deformed portion is formed to a second depth in the glass substrate through irradiation with a laser beam along a planned cutting line; and
an etching step in which the glass panel with the first deformed portion and the second deformed portion formed therein is etched such that etching of the glass substrate along the planned cutting line is completed before completion of etching of the glass substrate along the planned via-hole line,
wherein the second depth of the second deformed portion is greater than the first depth of the first deformed portion.

2. The method according to claim 1, wherein the second deformed portion is formed over the entire thickness of the glass substrate.

3. The method according to claim 1, wherein the second deformed portion is formed to the second depth from the upper surface or the lower surface of the glass substrate.

4. The method according to claim 1, wherein the second deformed portion is formed to a thickness corresponding to the second depth inside the glass substrate.

5. The method of claim 1, wherein the glass substrate is reduced in thickness from an initial thickness to a final thickness during the etching step and the first depth of the first deformed portion is greater than the final thickness of the glass substrate.

6. A method of processing a glass panel comprising a glass substrate, a display layer laminated on an upper surface of the glass substrate to display an image, and a protective layer laminated on an upper surface of the display layer to protect the display layer from an etchant, the method comprising:
a first deformed portion formation step in which, in order to form a via-hole in the glass substrate, a first deformed portion is formed to a first depth from the upper surface of the glass substrate through irradiation with a laser beam along a planned via-hole line while allowing a first non-deformed portion not irradiated with the laser beam to be formed between the first deformed portion and a lower surface of the glass substrate;
a second deformed portion formation step in which, in order to cut the glass substrate into unit cells, a second deformed portion is formed to a second depth in the glass substrate through irradiation with a laser beam along a planned cutting line;
an etching step in which the glass panel with the first deformed portion and the second deformed portion formed therein is etched until etching of the glass substrate along the planned cutting line is completed with a portion of the first deformed portion along the planned via-hole line remaining unetched; and
a removal step in which the remaining portion of the first deformed portion along the planned via-hole line is removed to complete formation of the via-hole in the glass substrate,
wherein the second depth of the second deformed portion is greater than the first depth of the first deformed portion.

7. The method according to claim 6, wherein the second deformed portion is formed over the entire thickness of the glass substrate.

8. The method according to claim 6, wherein the second deformed portion is formed to the second depth from the upper surface or the lower surface of the glass substrate.

9. The method according to claim 6, wherein the second deformed portion is formed to a thickness corresponding to the second depth inside the glass substrate.

10. The method of claim 6, wherein the glass substrate is reduced in thickness from an initial thickness to a final thickness during the etching step and the first depth of the first deformed portion is greater than the final thickness of the glass substrate.

* * * * *